United States Patent Office 3,560,493
Patented Feb. 2, 1971

3,560,493
SPIRO DIBENZO[a,d]CYCLOHEPTEN-OXAZOLIDINE AND OXAZINE
Martin A. Davis, Montreal, Quebec, Canada, assignor to Ayerst, McKenna & Harrison Limited, Laurent, Quebec, Canada
No Drawing. Filed Nov. 25, 1968, Ser. No. 778,779
Int. Cl. C07d 85/26, 87/06
U.S. Cl. 260—244                    3 Claims

ABSTRACT OF THE DISCLOSURE

There are disclosed herein spiro[5H-dibenzo[a,d]cyclohepten-5,2'-oxazolidine] and 3', 4', 5', 6'-tetrahydrospiro [5H - dibenzo[a,d]cyclohepten - 5,2' (2'H) - 1',3' - oxazine]. The compounds have antibacterial, trichomonacidal, and anticonvulsant activities and methods for their preparation and use are also disclosed.

---

This invention relates to novel chemical compounds having useful biological properties. More specifically this invention relates to novel spiro compounds comprising the 5H-dibenzo[a,d]cycloheptene ring fused at the 5-position to an oxazolidine or an oxazine ring at the 2-position. The novel compounds, which may be represented by the general Formula II, may be prepared from 5H-dibenzo [a,d]cyclohepten-5-one of Formula I and 2-aminoethanol or 3-aminopropanol according to the scheme shown diagramatically below:

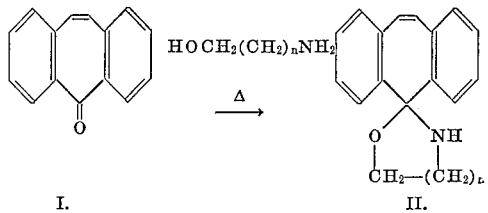

in which $n$ represents the integers 1 or 2.

In performing the reaction it is convenient to employ an excess of the amino alkanol as solvent and to carry out the condensation at the boiling point of this solvent. Alternatively a small molar excess of the amino alkanol may be used and the reaction effected in an inert, high boiling solvent such as, for example, diethylene glycol dimethyl ether. In either case the reaction is allowed to proceed for a sufficient time to allow essentially complete conversion of the ketone of Formula I into the desired product, generally from 10 to 40 hours. In order to isolate the final product the cooled reaction mixture is diluted with water and the mixture extracted with a substantially water-immiscible solvent. Removal of the solvent and recrystallization of the residual material affords the final product of Formula II.

The novel compounds of this invention possess useful properties as antibacterial agents. When tested, for example, by the method of Rammelkamp described in Proc. Soc. Exp. Biol. Med. vol. 51, p. 95 (1942), or in the procedure described by Grove and Randall in Assay Methods of Antibiotics, Medical Encyclopedia Inc., New York 1955, they have been found to have antibacterial effect against a number of gram-positive and gram-negative microorganisms including *Staphylococcus pyogenes*, *Sarcina lutea*, *Streptococcus fecalis*, *Escherichia coly*, *Aerobacter aerogenes*, *Salmonella pullorum*, *Pseudomonas aeruginosa*, *Proteus mirabilis*, and *Proteus vulgaris*.

For use as antibacterial agents the compounds may be formulated as lotions, creams or ointments containing from 0.1 to 2.0% of the active ingredient, together with suitable excipients. Such lotions, creams or ointments may be advantageously applied topically to the skin of warm-blooded animals several times daily. The compounds are also effective against the parasite *Trichomonas vaginalis* and are trichomonacidal agents. For such use they may be formulated with suitable excipients in the form of vaginal inserts or vaginal suppositories containing from 50 mg. to 500 mg. of the active ingredient and may be administered twice daily for periods of time of from two to several weeks.

The compounds also possess useful activity in the central nervous system of warm-blooded animals. Thus, in warm-blooded animals, when tested for example in rats, for their ability to inhibit maximal electroshock according to the method described by Swinyard et al., in J. Pharmacol., vol. 106, p. 319 (1952) at doses below those causing signs of toxicity or motor deficits, they afford protection against the seizures caused by electroshock. As this test is recognized by pharmacologists as a measure of anticonvulsant activity, the compounds of this invention are useful as anticonvulsant agents. For such purposes they may be formulated into tablets or capsules with excipients such as lactose, starch, magnesium stearate or magnesium silicate, each tablet or capsule containing from 25 to 250 mg. of the active ingredient and may be administered from one to four times daily for prolonged periods of time.

The following descriptive examples will illustrate this invention but are not construed to limit it thereto.

EXAMPLE 1

Spiro [5H-dibenzo[a,d]cyclohepten-5,2'-oxazolidine 5H-dibenzo[a,d]cyclohepten-5-one (41.2 g., 0.2 mole) is heated under reflux with efficient stirring with 2-aminoethanol (100 ml.) for 10 hours. The mixture is cooled, poured into ice-water and extracted into benzene. The organic layer is washed with water, dried and the solvent removed under reduced pressure to afford a yellow crystalline solid. Recrystallization from benzene-hexane (Norite) yields the title compound of Formula II ($n=1$) with M.P. 113–114° C., also identified by elemental analysis.

EXAMPLE 2

3',4',5',6(-tetrahydrospiro[5H-dibenzo[a,d]cyclohepten-5,2'-(2'H)-1',3'-oxazine]

5H-dibenzo[a,d]cyclohepten-5-one (41.2 g., 0.2 mole) is heated under reflux with efficient stirring with 3-amino-1-propanol (30 g., 0.4 mole) in diethylene glycol dimethyl ether (150 ml.) for 20 hours. The mixture is cooled, poured into cold water and extracted into benzene. The organic layer is washed well with water and then dried over sodium sulphate. Removal of the solvent under reduced pressure gives a yellow oil which crystallizes rapidly under hexane. Recrystallization from benzene-hexane (Norite) yields the title compound of Formula II ($n=2$) with M.P. 128–130° C., also identified by elemental analysis.

I claim:
1. A compound selected from those of the formula

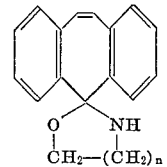

wherein $n$ represents an integer selected from 1 and 2.
2. Spiro[5H - dibenzo[a,d]cyclohepten - 5,2'-oxazolidine], as claimed in claim 1.
3. 3',4',5',6' - tetrahydrospiro [5H-dibenzo[a,d]cyclohepten-5,2'-(2'H)-1',3'-oxazine] as claimed in claim 1.

(References on following page)

References Cited

UNITED STATES PATENTS

| | | | |
|---|---|---|---|
| 2,865,925 | 12/1958 | Bolen | 260—307.6 |
| 3,138,608 | 6/1964 | Davis | 260—307.2 |
| 3,329,717 | 7/1967 | Krapcho | 260—307.6 |

FOREIGN PATENTS

| | | |
|---|---|---|
| 659,599 | 8/1965 | Belgium. |

OTHER REFERENCES

Davis et al.: J. Med. Chem. vol. 7, pp. 439–45 (1964) RSI. J5.

Davis et al.: J. Med. Chem., vol. 9, pp. 860–4 (1966) RSI. J5.

NATALIE TROUSOF, Primary Examiner

U.S. Cl. X.R.

260—307; 424—248, 272